Aug. 23, 1966 R. E. FUTER 3,267,585
CHANGING THE TEMPERATURES OF OBJECTS BY GAS JETS
Filed March 3, 1965 4 Sheets-Sheet 3

United States Patent Office 3,267,585
Patented August 23, 1966

3,267,585
CHANGING THE TEMPERATURES OF
OBJECTS BY GAS JETS
Rudolph E. Futer, Piedmont, Calif.
(2515 Willow St., Oakland, Calif.)
Filed Mar. 3, 1965, Ser. No. 436,857
23 Claims. (Cl. 34—20)

The invention is concerned with a method and apparatus for changing the temperatures of objects by moving them along a supporting conveyor and flowing high-velocity gas jets or streams relatively to said objects, said jets or streams having temperatures different from those of the objects, either colder to cool the objects or warmer to heat the objects. The invention is applicable, for example, to cooling metallic or plastic castings, pieces of extruded wax or resin, meats, fish fillets, vegetables, wrapped or unwrapped bread, berries, or the like, that are resting on a conveyor, suspended therefrom, or pressed against the conveyor by the jets.

The invention is useful, for example, for lowering the temperature of hot objects near to or above ambient temperature, as well as for chilling objects to achieve refrigeration. In other instances the invention may be applied to heat objects, e.g., in preparation to charging them into an oven or other processing unit.

It is known to change the temperature of objects moved by a conveyor by directing gas jets against them, either perpendicularly or with a flow component parallel to the direction of movement of the objects. The heat transfer between the gas and the object was, however, largely by convection, acting through a boundary layer or film of gas that enveloped the objects and had a temperature close to that of the object. Such a boundary layer can be disrupted only by gas flowing at high velocity relatively to the solid object. Prior practice made inefficient use of the gas jets, with the result that the boundary layers on the objects were disrupted only occasionally or not at all. To penetrate the boundary layer and obtain high heat transfer rates would, with known systems, have required excessively high gas jet velocities, leading to prohibitive gas supply pressures and gas flow rates through the jet orifices, requiring uneconomically large and costly gas-handling ducts.

Further, in prior attempts to cool or heat solid objects by gas jets, the individual gas jets acted individually on the objects and did not cooperate with each other to build up a gas current of high velocity. Apart from leading to a utilization of the gas supply which was far below the maximum in efficiency, this resulted in the engagement of the objects by the individual jets only at spaced intervals along the length of the conveyor, and the gas moved at only very low velocities relatively to the objects between the points of engagement by the gas jets.

For example, Somes, according to U.S. Patent 2,140,-337, Dec. 13, 1938, directs gas jets along the longitudinal axis of a conveyor at spaced intervals into a tunnel; however, each jet acts individually and is spaced longitudinally so far from the adjacent jet as well as from the objects being conveyed that the gas sweeps the objects only at very low relative velocity and heat transfer is principally by convection. Similarly, Schwartz, U.S. Patent 2,351,-549, June 13, 1944, directs a series of jets at angles to a moving filament; however, each gas jet is discharged at such a long distance from the point of emission of the next jet that the upstream jet is largely dissipated when the next down stream jet is formed. In both examples, the individual jets sweep the solid objects with local velocities very far lower than the average jet velocities measured in the jet-forming orifices.

The low relative velocity between the gas jet and the object surface prevailing in the cited patents is in part due to the fact that a gas pocket having a low velocity is formed within the confines of the jet outline upon striking the surface of the object at right angles, as well as to moderate angles of inclinations to the normal, usually greater than 45° to the normal to the surface, at which the jets strike the objects. In this connection, reference is made to pages 118 and 119 of the book, Fan Engineering, 6th edition (1961), published by Buffalo Forge Company, Buffalo, New York, U.S.A. FIGURE 60 on the latter page shows that only a small part of the gas sweeps the object surface at the high jet velocity; much of the gas is retarded and moves at considerably lower velocity. It follows that a very inefficient use of the gas jet is made by prior practices insofar as disruption of the boundary layer is concerned.

Now according to the invention, it was found that very high rates of heat transfer between the gas and the solid objects moved by a conveyor can be attained, suggesting at least partial disruption of the boundary layer, and that the total residence time of the objects in the zone within which they are subjected to gas currents can be reduced, by charging a series of gas jets, each directed at an angle less than 30°, preferably between 5–18°, to the line joining their starting points, and spaced so closely apart along said line that each succeeding jet flows essentially parallel to at least one and, preferably, several upstream jets still in being. In other words the downstream jet is situated at a distance less than the throw of one and, preferably, several upstream jets, and hence moves between the said upstream jet or jets and the object. Thereby the several jets cooperate to form a sheet of gas which moves at high velocity and has its principal flow component parallel to the said line but tending away therefrom toward the object. The result is that the said sheet of gas has an increased velocity. Further, being formed in close proximity to the object, it sweeps it with a high relative velocity and is not, as in most prior arrangements, dissipated before engaging the object.

The "throw" of a gas jet previously mentioned, is the distance downstream from its point of emanation, as from an orifice, throughout which the velocity profile of the jet will persist. Characteristics of gas jets are described on page 152 of Fan Engineering, op. cit., and a chart of throws is given in FIG. 71 on page 155; this should be read together with FIG. 70, on page 154 for rectangular jets. As applied to this invention, each gas jet emanates at a point nearer to the next upstream jet than the throw distance of the upstream jet, preferably nearer than the throw distance from several upstream jets. Thereby successive jets cooperate, i.e, reinforce each other to produce a gas sheet that moves with a velocity far greater than the velocity that would be achieved by a single jet. This phenomenon will be described in the sequel with reference to FIGURES 5 and 6.

Not only does the series of jets produce a gas sheet of high velocity, having regard to the gas supply pressure and the initial jet velocities, well suited to attain high rates of heat transfer by at least partial disruption of the boundary layers, but the gas sheet can be made to act over a long, continuous distance, to act on the object throughout the full length of the conveyor or over a series of segments of desired lengths of the conveyor, with intervening gaps for discharging the spent gas. Both factors conspire to shorten the overall time required to achieve a given temperature change in the objects.

The gas sheet produced by the jets may have a width commensurate to the corresponding dimension of the objects to be swept thereby; thus a wide gas sheet may be formed by emitting a series of individual gas jets through slits that are elongated transversely to the direction of movement of the gas sheet. However, the sheet may be formed by a multitude of passageways of any cross section distributed over an extended area of a membrane. In a preferred embodiment, the jets are produced by a jet device that includes a plenum chamber to which the gas is supplied at a pressure exceeding the pressure at the objects, one wall of the chamber being a membrane that has louvered slits formed therein, as described in my U.S. Patent 3,131,974. In such a membrane the surface directed to the objects is longitudinally unobstructed and is continuous save for the depressions of the louvers, and the resulting gas sheet moves along said surface with high velocity, essentially parallel thereto but with a minor velocity component away therefrom to engage and sweep the objects on the conveyor. The unobstructed membrane surface may be directed downwardly (inverted from the position shown in the said patent) when it is mounted above the conveyor. However, the present invention is not restricted to providing such a continuous membrane surface toward the objects; thus, the membrane of the aforesaid patent can be reversed, so that the membrane louvers are toward the objects.

In lieu of or in addition to the stated positioning of the membrane above the objects on the conveyor, membranes may be provided at one or on both sides of the moving objects with the membranes vertical or inclined to the vertical, and/or, in the case of a conveyor that is above the objects, e.g., for suspending them, a membrane provided with apertures for the upward flow of gas therethrough may be situated beneath the conveyor, to provide a gas sheet having an upward flow component. Any combination of such dispositions may be used. In any arrangement, the membrane is advantageously situated as closely as possible to the objects, so that the velocity of the gas sheet is not materially dissipated before engaging the objects.

The direction of movement of the gas sheet relatively to the conveyor may be varied and selected as desired, having regard to the configuration of the objects. Usually, this direction of movement is substantially parallel to the longitudinal direction of the conveyor, either upstream or downstream or both in different sections thereof. In such cases the projections onto the membrane of the axes of the individual gas jets make angles less than 30°, e.g., 0°, to the longitudinal direction of the conveyor.

The direction of gas flow may, however, be essentially transverse to the longitudinal direction of the conveyor, e.g., horizontal, up or down. In these cases the projections onto the membrane of the axes of the individual gas jets make angles greater than 60°, e.g., 90°, to the longitudinal direction of the conveyor. Of course, the intermediate angles are not excluded from the scope of this invention.

In some embodiments, the direction of gas flow is the same, either upstream or downstream, or upwards or downwards, throughout any one section of the conveyor. However, as will appear, combinations of flow directions of other patterns may be employed in special situations. For example, the gas sheet may flow longitudinally on one side and vertically on the other side of the objects; or they may move horizontaly outwards from the center at the top, and downwards at the sides, of the objects.

The conveyor may be of any suitable type and the invention is not restricted to any specific form. For example, the conveyor may support the objects against fall by gravity and be an impervious belt or one having large gas passages, e.g., formed with separated links, to permit the gas sheet to flow therethrough, or may be formed by a sheet of gas-permeable material against which the gas sheet is directed, or may comprise a cable or chain provided with longitudinally spaced fasteners, such as hooks or clamps, by which the objects can be suspended. In any case, the conveyor supports the objects, usually by affording support against downward movement by gravity but, in some embodiments, by affording support against upward movement, usually associated with means limiting relative longitudinal movement, as when light objects such as berries, almonds, or other granules are urged upwards by the gas jet against a pervious conveyor through which gas flows and against which the objects are held by the moving gas.

The temperature-conditioning zone within which the gas sheet sweeps the objects may take a variety of forms, such as a closed conduit or tunnel, having provision for the discharge and, if desired, the collection of spent gas, or it may be open to the atmosphere throughout substantially its full length. In a specific embodiment, the said zone is surrounded by a wall structure enclosing a chamber to which gas, such as air, is supplied at a reduced (or elevated) temperature, and the blowers supplying gas to the jets receive the gas at the desired temperature from the enclosed chamber. Thus the gas (air) is brought to the proper temperature by means separate from those used to force the gas through the jet-forming passageways. However, the temperature-conditioning means for the gas jets can be a part of the means for supplying the gas under pressure, whether or not situated within a wall-enclosed chamber. The choice is made on the basis of the required temperature of the escaping gas and whether it is to be collected for re-use. It may be noted that when a closed duct or tunnel is used, as for cooling baked wrapped or unwrapped bread, the roof and sides of the tunnel may all be formed as continuous, jet-forming membranes.

In general, it is preferred that the gas sheet, formed by the longitudinal series of gas jets, sweep the objects with a relative velocity of at least 20 ft. per sec., and relative velocities of 50 to 150 ft. per sec. are preferred.

Having indicated the nature of the invention, reference is made to the accompanying drawings forming a part of this specification and showing certain preferred embodiments by way of illustration, wherein.

Figures 1, 2, 3, 4:
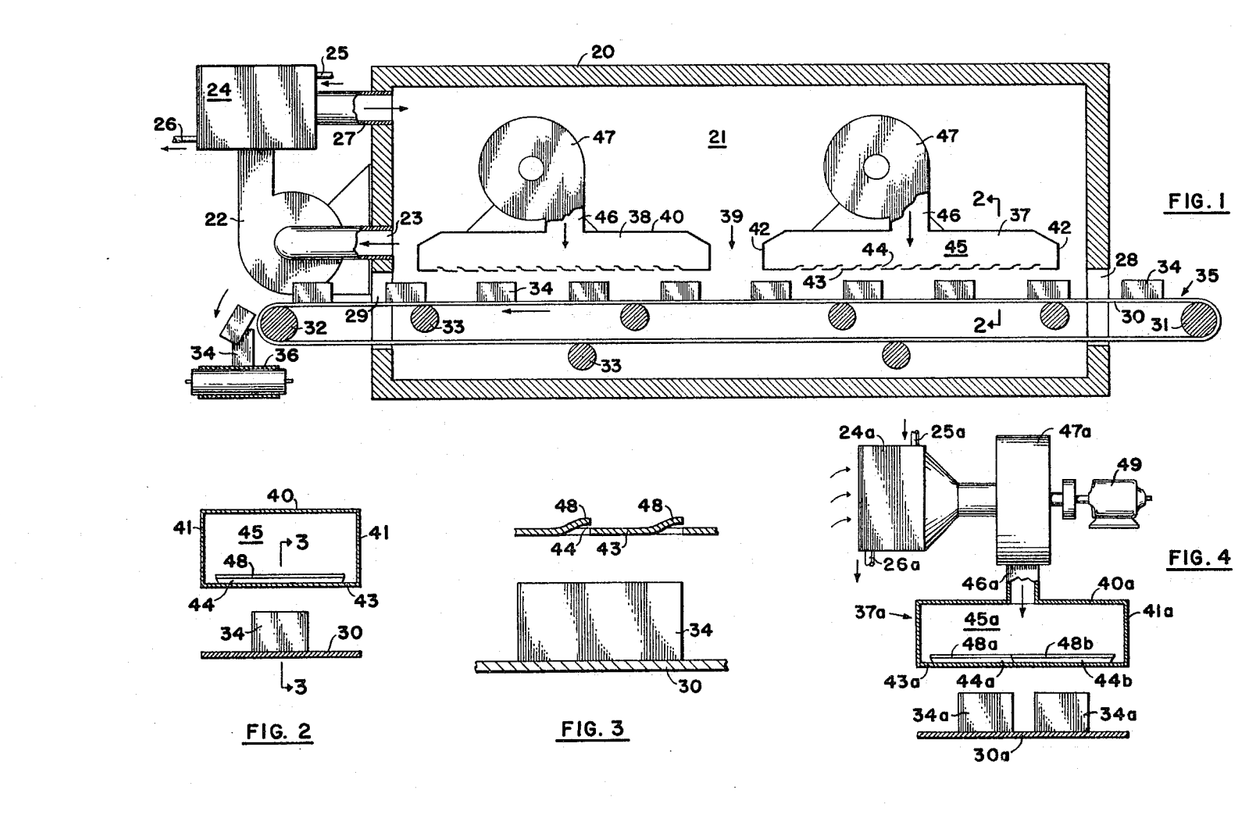
FIGURE 1 is a longitudinal sectional view of one embodiment of the invention, using a conveyor belt which supports the objects against gravity and having several gas-fed membranes situated above the objects, the gas being externally temperature-conditioned.
FIGURE 2 is a transverse sectional view to an enlarged scale, taken on the line 2—2 of FIGURE. 1.
FIGURE 3 is a sectional view, to a further increased scale, taken on the line 3—3 of FIGURE 2.
FIGURE 4 is a sectional view, similar to FIGURE 2, of a modified embodiment providing a temperature-conditioning heat exchanger directly associated with the gas jet device.

Referring to FIGURES 1–3, a wall structure 20, e.g., made of heat-insulating material, encloses a chamber 21 to which cooled gas, e.g., air, is supplied by a blower 22 having a suction duct 23 leading to the chamber 21 and discharging gas under pressure to a heat exchanger 24 to which a refrigerant is supplied by a pipe 25. Spent refrigerant is discharged at 26. The cooled gas is charged into the chamber 21 via a duct 27. (When the apparatus is used to heat objects, heated gas is supplied to the chamber, and a heating medium such as steam is supplied by the pipe 25.)

The wall structure has end openings 28, 29 (which may be provided with heavy curtains, not shown), through which extends a conveyor 30, e.g., a continuous impervious or pervious belt having terminal rollers 31, 32, of which one is a driving roller equipped with driving means, not shown, and supported at necessary intervals by idler rollers 33. The objects 34 to be cooled (or heated), of any configuration, represented for simplicity as having rectangular outlines, are placed onto the conveyor at 35, suitable handling and loading mechanism (not shown) being provided if manual loading of the objects onto the conveyor is not feasible. The objects move via the openings 28, 29, through the lower part of the chamber 21 on the conveyor and are discharged at the other end, e.g., by falling by gravity onto a collector, e.g., a take-off conveyor 36.

The chamber 21 contains one or more, e.g., two devices for forming sheets of temperature-conditioning gas and for directing said sheets at high velocity relatively to the objects. As shown, the two devices shown at 37 and 38 are separated by a gap 39 and are identical in detail save that their membranes are oppositely oriented, so that both direct sheets of gas toward the gap 39. Hence, only one device will be described in detail.

Each of the devices 37 and 38 includes a wall structure, e.g., made of sheet metal, including upper, side and end walls 40, 41 and 42, and a bottom membrane 43 that extends substantially parallel to the conveyor, spaced therefrom by the least distance sufficient to clear the objects 34, and having gas passages 44 extending therethrough. The said walls and membrane enclose a plenum chamber 45 which is supplied with gas under a pressure greater than that prevailing within the chamber 21 by a duct 46 fed by a blower 47. The latter has its suction intake open to the chamber 21 to receive cool (hot) gas therefrom.

The membrane 43 is preferably formed to provide passages 44, shaped as transverse slots that direct the gas from the plenum chamber 45 in directions principally parallel to the lower membrane surface, which is unobstructed in the longitudinal direction and continuous save for the bent louver portions to be described. The gas jets have minor downward components. As is shown in FIGURE 3, each passage may be formed by incising the membrane transversely and pressing a lip or louvers 48 upwards to extend substantially parallel to the membrane but spaced above it, without horizontal overlap with the adjacent edge of the incision, to form transversely elongated slit-shaped passages. The construction is advantageously according to that described in my aforesaid U.S. Patent No. 3,131,974. As further described in said patent, the passages have widths many times their heights and the slits can be arranged in a plurality of parallel, longitudinal rows, e.g., when the width of the membrane 43 is more than about 20 times the slit height, to avoid excessively long slits. In this case the slits in each row are advantageously staggered longitudinally with respect to the slits of an adjacent row, thereby providing structural stability to the membrane; also to avoid dead zones, wherein gas is not ejected at high velocity, the slits of each such row of staggered slits overlap the slits of the adjacent row(s) transversely, i.e., along the lengths of the slits. The vertical spacing between the lower face of each lip or louver 48 and the upper face of the continuous membrane is typically between $\frac{1}{32}$ and $\frac{1}{16}$ inch. The details of the membrane construction, being fully described and illustrated in the said patent, are not further presented in this specification. Although the longitudinally unobstructed and continuous surface of the membrane is preferably directed toward the objects 34 (downwardly, as shown), this is not an absolute requirement of this invention, and the membrane can be positioned inverted from that shown, with the louvers 48 extending toward the objects as will be shown in FIGURES 7 and 8. In any case, the membrane is substantially unobstructed save for the louvers.

The several longitudinally consecutive gas passages 44 (i.e., the passages within each longitudinal row when several rows are used) cooperate to form a sheet of gas that moves at a high velocity along the membrane, greater than that of any single jet, and having only a minor downward flow component, to sweep the objects 34. The gas jets issue from the passages 44 predominantly parallel to the lower membrane surface and each jet, except the one at the upstream extremity flows parallel to at least one and, preferably, several upstream jets, to form the gas sheet. In other words, each gas jet is sufficiently close to the next upstream jet to be within the "throw" distance of the latter and, preferably, within the throw distances of three or more upstream gas jets. The cumulative effect of such closely spaced jets is shown in FIGURES 5 and 6.

Figure 5:
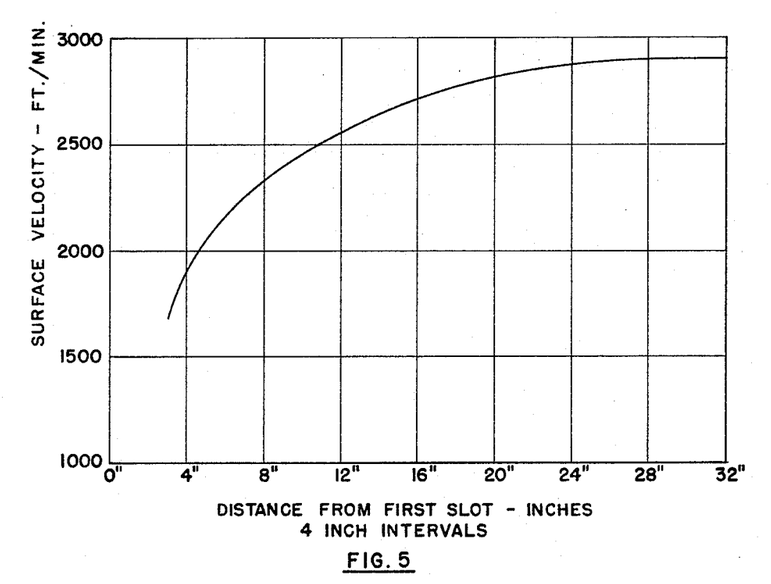
FIGURE 5 is a graph showing the relation of the component of the gas stream velocity adjacent to the membrane surface at successive distances downstream from the first, upstream slot, in a membrane wherein the slots were spaced 4 inches apart and the gas velocity through each slot was 3900 ft. per min.

In FIGURE 5, ordinates show the horizontal, downstream gas velocity components of air currents, measured parallel to the membrane, produced by a series of slots shaped as shown in FIGURES 2 and 3, the slots extending perpendicularly to the downstream direction and spaced 4 in. apart. Each gas jet had a linear velocity of 3,900 ft. per min., inclined away from the membrane surface. The abscissae give the distances from the first or upstream jet. It is noted that the horizontal velocity components of the resulting gas sheet increased asymptotically toward 2,900 ft. per min., and that a high flow velocity parallel to the membrane required several jets. Thus, five or more jets were required to attain a horizontal velocity of over 2,700 ft. per min. Only a very low flow component in the downstream direction is produced by a single gas jet. This cooperative effect is attained only when each downstream jet issues at a distance from the adjacent upstream jet or jets less than the "throw" of the latter, that is, within a distance at which the velocity profile of the upstream jet persists. Jets loose their coherency at some distance downstream from the orifices forming them, leading to diffusion-like, low velocity flows, and the cooperative action of a series of jets, as indicated in FIGURE 5, is attained only if the successive jets are not diffused at the point at which they are reinforced by one or more downstream jets.

Figure 6:
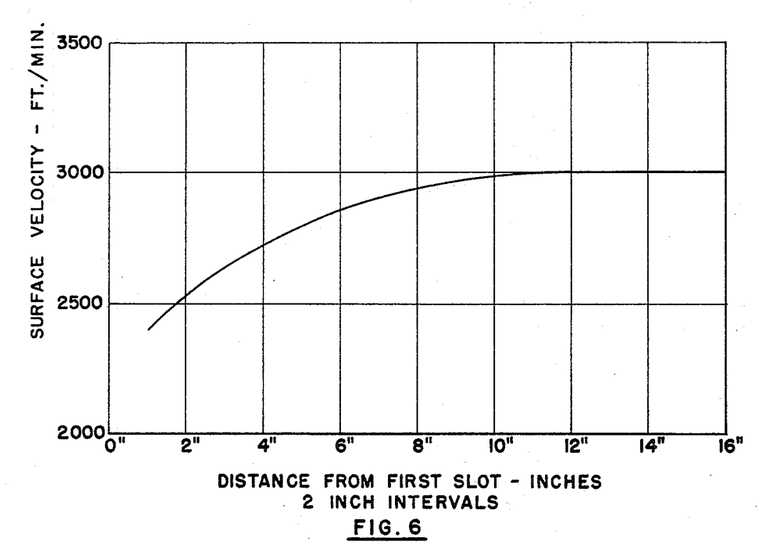
FIGURE 6 is a graph similar to FIGURE 5 wherein the membrane had slots spaced 2 inches apart and providing gas jets of the same velocities.

FIGURE 6 shows a similar graph for like slots, producing jets of like linear velocities, but spaced 2 in. apart. Again, there is an asymptotic increase in the gas sheet velocity, here toward 3,000 ft. per min., but the rate of velocity rise is greater, so that only three jets suffice to attain a velocity of 2,700 ft. per min.

It is evident from the graphs described that the effect of successive gas jets is cumulative and that a high gas sheet velocity parallel to the membrane is attained only by the joint action of a plurality of longitudinally spaced jets. The longitudinal spacings of the jets need not, of course, be uniform, and a closer spacing may be used at the upstream end of a membrane to build up the high gas sheet velocity more rapidly.

Reverting to FIGURES 1–3, the objects 34, in moving on the conveyor 30 through the temperature-conditioning zone provided within the chamber 21 between the conveyor 30 and the membranes 43, are swept with gas sheets at high relative velocity, which disrupt the boundary layers on the objects and lead to a very rapid rate of heat transfer. The gas from these sheets escapes principally through the gap 39 into the upper part of the chamber 21, but flows also partially out from the sides of the devices 37 and 38. The gas supplied to the jets by the blowers 47 is at a temperature which is below (or above) the objects, and is maintained at this temperature by the heat exchanger 24.

In the embodiment shown in FIGURE 4, the objects 34a are moved on a conveyor 30a, which may be wider to accommodate a plurality of objects side by side or in staggered relation, and the device 37a is constructed as previously described for device 37, save that the blower 47a is provided with an individual heat exchanger 24a, with refrigerant inlet 25a and outlet 26a, and driven by an electric motor 49. The device includes walls 40a, 41a, and end walls (not shown), a membrane 43a, and gas passages formed as slots 44a and 44b by lips 48a and 48b, arranged in parallel rows with the slots overlapping laterally. Reference numbers with letter suffixes correspond to those previously described. The embodiment of FIGURE 4 may be mounted within a wall structure like structure 20 previously described, or independently thereof. When mounted within a wall structure 20, the latter may include a blower 22 and heat exchanger 24, as previously described, to serve as a booster for the exchanger 24a.

Figure 7:
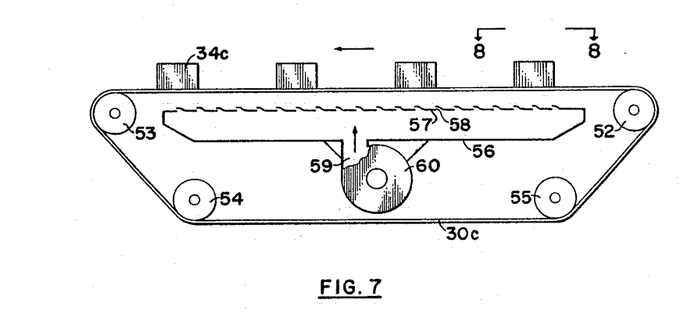
FIGURE 7 is a side elevation, the membrane and plenum chamber wall appearing in section, of a third embodiment wherein gas jets are directed from beneath the conveyor, which conveyor is largely open to permit the passage of the gas sheet.
Figure 8:
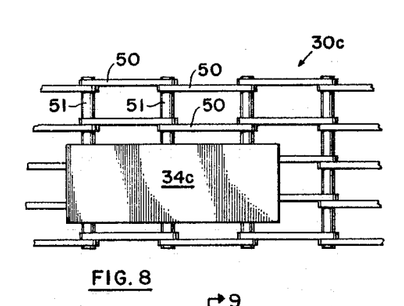
FIG. 8 is an enlarged fragmentary plan view taken on the line 8—8 of FIGURE 7.

FIGURES 7 and 8 show an embodiment in which the gas sheet is formed below the objects 34c, which are supported on a conveyor 30c which is open to permit the gas sheet to sweep upwards therethrough. The conveyor includes narrow links 50 pivoted on transverse pins having spacer bushings 51, and moving about rollers 52–55, at least one of which is a drive roller. Idler rollers, not shown, may be provided as required. The gas sheet is formed by a device including a wall structure 56 having an upper membrane 57 with passages 58 and supplied with gas via a duct 59 by a blower 60. The membrane and its passages, may be constructed as previously described for the device 37 but inverted, relatively to the objects, i.e., have the louvers directed towards the objects, and the blower 60 may take gas from an enclosure as described for FIGURE 1 and/or have a separate temperature-changing heat exchanger as shown at 24a in FIGURE 4.

Figure 9:
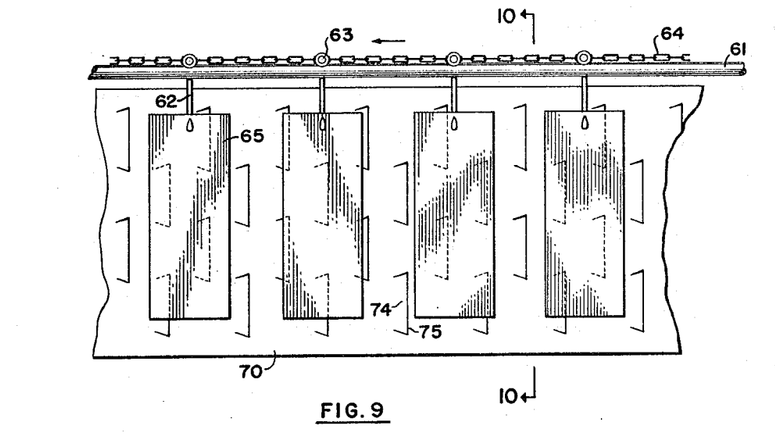
FIGURE 9 is a sectional view taken on the line 9—9 of FIGURE 10, showing a fourth embodiment, wherein the objects are suspended and gas jets are directed against the objects from the both sides and move respectively, longitudinally and vertically.
Figure 10:
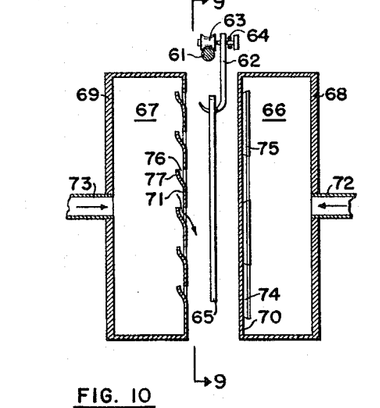
FIGURE 10 is a transverse sectional view taken on the line 10—10 of FIGURE 9.

FIGURES 9 and 10 show another embodiment wherein the conveyor comprises a supporting upwardly convex rod 61 which supports a series of longitudinally spaced hooks 62 provided with rollers 63 having peripheral concave outlines for rolling on the rod 61 and moved by a connecting chain 64. The hooks 62 support the objects 65 to be cooled (heated), e.g., metal plates as shown, or fish filets, etc. On each side of the path of the objects 65 is a chamber 66 or 67, including a wall structure 68 or 69 and having a membrane 70 or 71. These chambers are supplied with cooled (heated) gas via ducts 72 or 73 from blowers and heat exchanger (not shown).

The membrane 70 has gas passages shaped as vertical slots 74 formed by lips or louvers 75 pressed inwardly to the chamber 66, the said slots being arranged in a plurality, e.g., four or more longitudinal rows with the individual slots in each row staggered longitudinally and laterally overlapping the slots of adjacent rows. Thereby there is formed a gas sheet which moves parallel to the direction of movement of the objects 65, in the upstream direction as shown.

The membrane 71 at the other side has gas passages similarly shaped as horizontal slots 76 formed by pressing lips or louvers 77 inwardly to the chamber 67 to produce a downwardly moving sheet of gas. The slots 76 may be similarly arranged in a plurality of vertical rows, with the slots in each row staggered vertically and, if desired, longitudinally overlapping those of the adjacent rows.

The gas of the sheet from the membrane 70 escapes from the space between the membranes at the top and bottom of the space between said membrane and the objects, and the gas from the spent sheet formed by the membrane 71 escapes principally from the bottom of the space between the membrane 71 and the objects. Such a combination of gas sheets, moving at mutual right angles, is effective in attaining a high velocity of the gas sheets without opposing each other by engagement at the intervals between the objects.

It will be understood that the directions of gas flows indicated in FIGURES 9 and 10 is merely illustrative and not limiting. Thus the gas sheets formed by the membranes 70 and 71 may move in the same directions, longitudinally or vertically.

Figure 11:
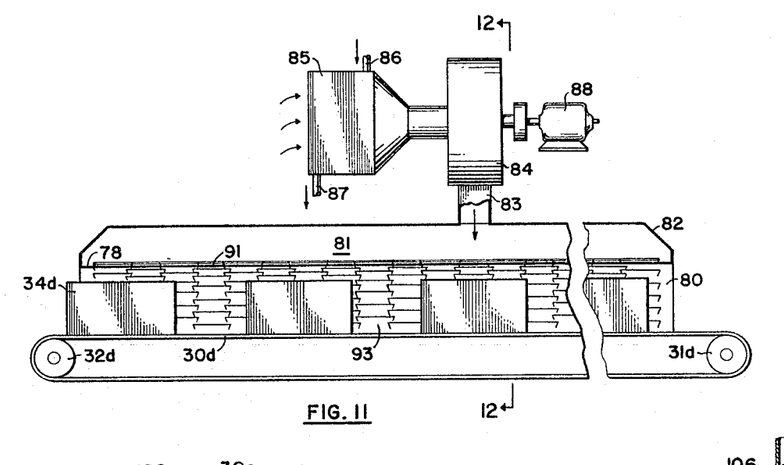
FIGURE 11 is a longitudinal sectional view of a fifth embodiment providing a tunnel for cooling wrapped or unwrapped objects, such as bread.
Figure 12:
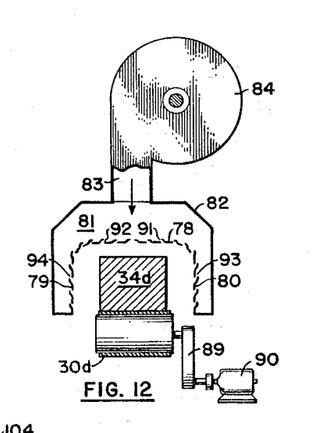
FIGURE 12 is a transverse sectional view taken on the line 12—12 of FIGURE 11.

FIGURES 11 and 12 show another embodiment which employs a tunnel-shaped membrane structure, suitable for changing the temperature of a series of objects 34d of predominantly uniform external dimensions, such as hot loaves of bread. In this embodiment, the conveyor 30d, moving about principal rollers 31d and 32d, and provided, if desired, by idler rollers (not shown) moves beneath or within the lower region of a tunnel-shaped membrane that includes an upper, horizontal part 78 and vertical, lateral parts 79 and 80. These membrane portions are conjoined and form the discharge surfaces of a plenum chamber 81 defined by a housing or wall structure 82 to which cooled (or heated) gas is supplied through a duct 83 by a blower 84. This blower may take suction through a heat exchanger 85 to which a refrigerant (or heating medium) is passed via pipes 86 and 87. The blower is driven by an electric motor 88. (Again, the blower may take suction from a temperature-conditioned gas chamber such as chamber 21 shown in FIGURE 1, and the exchanger 85 may then be omitted.) The conveyor is shown to be driven via a belt 89 from an electric motor 90.

The horizontal membrane part 78 has gas passages 91 and 92 extending therethrough and directed laterally outwardly from the center, and the vertical membrane parts have passages 93 and 94 that are directed downwardly. All of these passages may be formed as previously described, e.g., by depressing lips or louvers of the membrane into the plenum chamber and may be arranged in parallel rows with slots in each row staggered and laterally overlapping those of adjacent rows, as appears in FIGURE 11.

The several gas passages form gas sheets of high velocities that move laterally outwardly from the center of the upper membrane part 78 and thence downwardly along the vertical parts 79 and 80, to sweep the objects 34d with high relative velocities and thereby effect a rapid change in the temperatures of the objects. It is evident that, in the drawings, only a few passages were shown; in the physical embodiment, a larger number of passages of small dimensions and, if desired, at closer intervals are provided.

Figure 13:
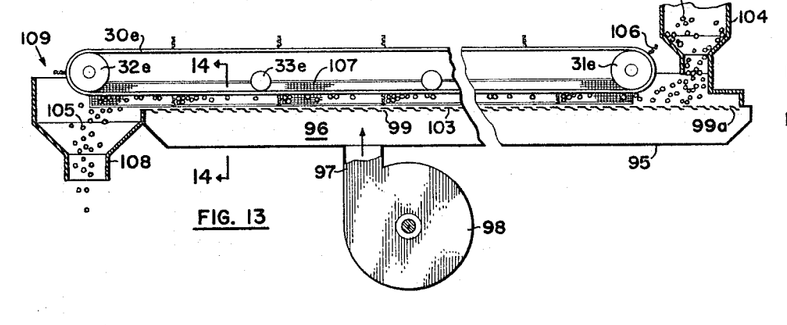
FIGURE 13 is a longitudinal sectional view of a sixth embodiment wherein light, small objects, such as berries or almonds are supported on the underside of a conveyor by the upward force of the gas jets.
Figure 14:
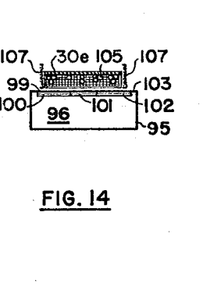
FIGURE 14 is a sectional view taken on the line 14—14 of FIGURE 13.

FIGURES 13 and 14 show still another embodiment of the invention wherein light objects are entrained by the gas and are carried upwards against a moving conveyor that limits upward and travel of the objects, forward travel being limited by the pervious cleats on the belt. This embodiment is suitable, for example, for temperature-conditioning small objects, such as berries, nuts, or cereal. The apparatus includes a conveyor belt 30e running on terminal rollers 31e and 32e and optionally provided with idler rollers 33e, the lower traverse of said belt being of flat or transversely upwardly concave cross section that may be pervious, e.g., made of fabric having passages for gas, or of metallic material, such as that shown in FIGURE 8 but having a small mesh or covered by a small-mesh wire screen, so that the objects cannot pass through the belt. The apparatus includes a wall structure 95 that encloses a plenum chamber 96 supplied with cooled (or heated) gas by a duct 97 from a blower 98. The gas escapes from the chamber through passages 99, e.g., formed by three parallel rows of staggered lips 100, 101 and 102 formed in a membrane 103, to form a high-velocity gas sheet moving in the downstream direction of movement of the lower part of the conveyor 30e. The apparatus further includes a feed chute 104 to which the objects 105 are supplied and by which they are fed toward the membrane. Several passages of the membrane are situated upstream from the chute, as indicated at 99a, whereby a well-formed sheet of gas engages the objects to carry them downstream along the membrane. A plurality of transverse, gas-pervious walls or cleats 106 are fixed to the conveyor belt 30e transversely thereto, e.g., including screens of mesh small enough to prevent passage of the objects. These cleats extend far enough out from the belt to move so close to the membrane that the objects cannot pass therebetween; the cleats may even wipe the membrane. A pair of lateral, dependent walls 107 may optionally be provided at the belt margins, especially when the belt 30e is downwardly flat, to confine the objects. These side walls may, if desired, also provide gas-escape passages, e.g., be formed of wire screen as shown, of such small mesh to retain the objects and prevent excessive gas flow; however, impervious side walls may be used.

At the downstream end of the conveyor there is provided a gravity discharge chute 108 having a large gas-escape opening 109 at the top. It is preferred that the belt 30e extend downstream beyond the last gas passage through the membrane so that the upward force of the gas acting against the belt is greatly diminished or quite spent at the end of the belt, so that the objects fall from it. Also, the opening 109 is preferably large enough so that any gas flowing upwardly therethrough moves at less than entraining velocity. The chute 108 is preferably joined to the chamber 96.

In operation, the objects 105 are supplied through the chute 104 onto the membrane 103 and swept forwardly thereon by the gas sheet, which is well formed in a short distance by the closely spaced upstream passages 99a. This gas sheet moves more rapidly than the conveyor belt 30e and the objects are swept downstream until they engage a transverse pervious cleat 106. At this point the objects are blocked and move upwards against the pervious conveyor belt, through which a sufficiently large amount of the gas escapes to hold the objects pushed against the lower surface. The objects are swept all along the conveyor with the gas sheet, a part of which moves downstream through successive cleats, another part escapes through the side walls 107, and a sufficiently large part flows through the belt to maintain the objects elevated. The upward flow is largely dissipated at the downstream end of the belt, permitting the objects to fall by gravity into the chute 108.

The invention is not restricted to maintaining the small objects pressed against the underside of the belt 30e. Thus, the permeability of the belt may be such, in relation to the rate of gas flow, that only some of the objects move in engagement with the belt and most are turbulently suspended in the space between the membrane and the belt.

I claim as my invention:

1. The method of changing the temperatures of objects having initial temperatures to be changed, which comprises the steps of:
    (a) moving a succession of said objects at said initial temperatures with a moving supporting conveyor,
    (b) moving said conveyor and the objects through a temperature-conditioning zone in a longitudinal downstream direction,
    (c) forming a sheet of conditioning gas having a high velocity relatively to said moving objects by
        (1) flowing a series of high-velocity, overlapping gas jets having temperatures different from said initial temperatures from spaced points within said conditioning zone,
        (2) said jets being inclined at angles less than 30° to a line joining said points and being so directed and so closely spaced that each jet, save that at an end of the series, issues substantially parallel to at least one other jet, and successive jets of the series jointly form said gas sheet, and
    (d) sweeping said objects while moving through said zone with said gas sheet at high relative velocity to effect a rapid change in the temperature thereof.

2. Method as defined in claim 1 wherein said series of jets issue from points disposed on a line substantially parallel to said longitudinal direction and have major flow components parallel to said direction.

3. Method as defined in claim 1 wherein said jets have major flow components in a plane perpendicular to said longitudinal direction.

4. Method as defined in claim 1 wherein at least one gas sheet is formed at each side of said conveyor.

5. Method as defined in claim 1 wherein a gas sheet is formed above the conveyor.

6. Method as defined in claim 1 wherein said objects are suspended from the conveyor and a gas sheet is formed beneath the conveyor.

7. Method as defined in claim 1 wherein said objects are entrained by said gas sheet upwards against the underside of a moving conveyor belt that has passages for the upward escape of gas.

8. Method as defined in claim 7 wherein said gas sheet moves longitudinally in the downstream direction of movement of said conveyor belt at a linear velocity greater than that of the belt and the said objects are retarded to the velocity of the belt.

9. The method of changing the temperatures of objects having initial temperatures to be changed, which comprises the steps of:
    (a) engaging a succession of said objects at said initial temperatures along to a moving supporting conveyor,
    (b) moving said conveyor and the engaged objects through a temperature-conditioning zone in a longitudinal downstream direction,
    (c) forming a sheet of conditioning gas having a high velocity relatively to said moving objects by
        (1) flowing a series of high-velocity, overlapping gas jets having temperatures different from said initial temperatures from spaced points through a membrane that extends through said zone substantially parallel to the conveyor,
        (2) said jets being inclined at angles less than 30° to the surface of said membrane and being so directed and so closely spaced that each jet, save that at an end of the series, issues from the membrane substantially parallel to at least one other jet that has a major flow component parallel to the membrane and successive jets of the series jointly form said gas sheet, and
(d) sweeping said objects while moving through said zone with said gas sheet at high relative velocity to effect a rapid change in the temperature thereof.

10. Method as defined in claim 9 wherein said jets are spaced longitudinally and have major flow components parallel to said longitudinal direction, each jet being elongated transversely to said direction and having a length many times the width thereof.

11. Method as defined in claim 9 wherein at least some of said jets are spaced along a line extending transversely to said longitudinal direction, each jet being elongated transversely to said line and having a length many times the width thereof.

12. Apparatus for changing the temperature of solid objects by means of a sheet of conditioning gas having a temperature different from the temperatures of said objects and sweeping said objects with gas at high relative velocity, which comprises:
(a) a movable, longitudinally elongated conveyor adapted to support said objects in engagement therewith,
(b) a jet device for forming a sheet of gas extending generally parallel to said conveyor including
 (1) a plenum chamber on the side thereof remote from the conveyor,
 (2) a series of gas passageways for the flow of gas from said chamber toward said conveyor, said passageways having axes inclined at angles less than 30° to a line joining them and being closely spaced along said line so that each passageway axis is substantially parallel to the axis of at least one other passageway which is upstream therefrom and situated between the conveyor and the jet device,
 (3) whereby a succession of gas jets issuing from said passageways cooperate to form said gas sheet, and
(c) means for supplying gas under pressure to said plenum chamber at a temperature different from the temperatures of said objects.

13. Apparatus as defined in claim 12 wherein said jet device includes a membrane having said passageways formed therein and having a surface directed to said conveyor which is subtsantially unobstructed.

14. Apparatus as defined in claim 13 wherein the projections onto the membrane of the said axes of the passageways make angles less than 30° to the longitudinal axis of the conveyor.

15. Apparatus as defined in claim 13 wherein the projections onto the membrane of the said axes of the passageways make angles more than 60° to the longitudinal axis of the conveyor.

16. Apparatus as defined in claim 12 wherein a jet device is provided at each side of the conveyor, for sweeping said objects with the resulting gas sheet from both sides of the conveyor.

17. Apparatus as defined in claim 12 wherein at least one jet device is situated above the conveyor.

18. Apparatus as defined in claim 12 wherein said conveyor is of the type that suspends said objects and at least one jet device is situated beneath the conveyor.

19. Apparatus as defined in claim 12 wherein:
(a) said conveyor and jet device are situated at least in part within a wall structure defining a chamber, and
(b) said means for supplying gas under pressure includes:
 (1) blower means having a suction intake connected to said chamber and a pressure outlet connected to said plenum chamber, and
 (2) separate blower means and heat exchange means interconnected for circulating air from said chamber through the heat exchange means and into the said chamber.

20. Apparatus as defined in claim 12 wherein said means for supplying gas under pressure includes
(a) a heat exchanger for changing the temperature of gas, and
(b) blower means for flowing gas through said heat exchanger and into said plenum chamber.

21. Apparatus for changing the temperature of solid objects of approximately uniform size by means of conditioning gas having a temperature different from the temperatures of said objects and sweeping said objects with gas at high relative velocity, which comprises:
(a) a movable, longitudinally elongated conveyor adapted to support said objects in longitudinally spaced relation,
(b) a jet device for forming a sheet of gas extending generally parallel to said conveyor, including,
 (1) a tunnel-shaped plenum chamber including confining outer walls and bounded by a membrane that surrounds a zone above said conveyor at the top and sides of said zone with top and side membrane portions and open at one vertical extremity,
 (2) said membrane being formed at the top and side portions thereof with a series of gas passages extending therethrough for the flow of gas from said chamber having axes inclined at angles less than 30° to a line joining said passages and spaced so closely along said line that each passage axis is substantially parallel to the axis of at least one other passage which is upstream therefrom and situated between the said zone and the respective membrane portion,
 (3) whereby a succession of gas jets issuing from said passages cooperate to form said gas sheet, and
(c) means for supplying gas under pressure to said plenum chamber at a temperature different from the temperatures of said objects.

22. Apparatus as defined in claim 21 wherein said passages include:
(a) longitudinally elongated slits formed in said top membrane portion, having louvers inclined to direct gas jets along said portion, a first group of said slits being directed to form a gas sheet moving toward one side of said tunnel and a second group being directed to form a gas sheet moving toward the other side, and
(b) longitudinally elongated slits formed in each of said membrane portions, having louvers inclined to direct gas jets along said side portions toward the open extremity, to form separate gas sheets flowing toward said open extremity.

23. Apparatus for changing the temperature of solid objects of small, particulate outlines and entrainable in a gas current by means of conditioning gas having a temperature different from the temperatures of said objects with gas at high relative velocity, which comprises:
(a) a movable, longitudinally elongated conveyor belt having a downwardly directed, gas-pervious surface adapted to retain said objects against passage therethrough,
(b) a plurality of gas-pervious barriers fixed to said belt at longitudinal intervals,
(c) a plenum chamber including confining walls and closed at one side by a membrane that extends longitudinally parallel to said belt thereunder in close proximity to the outer extremities of said barriers,
(d) said membrane being formed with a series of gas passageways for the flow of gas from said chamber toward said belt, said passageways having axes inclined at angles less than 30° to a line joining them and being closely spaced along said line so that each passageway axis is substantially parallel to the axis of at least one other passageway which is upstream therefrom and situated between the belt and the membrane, whereby a succession of gas jets issuing from said passageways cooperate to form said gas sheet, and (e) means for supplying gas under pressure to said plenum chamber at a temperature different from the temperatures of said objects.

References Cited by the Examiner
UNITED STATES PATENTS

| | | | |
|---|---|---|---|
| 1,930,414 | 10/1933 | Buhr | 62—380 |
| 2,060,430 | 11/1936 | Spooner | 34—23 |
| 2,144,919 | 1/1939 | Gautreau | 34—23 |
| 2,419,380 | 4/1947 | Van Etten | 62—380 |
| 2,693,353 | 11/1954 | Vaughan | 62—63 |
| 3,068,586 | 12/1962 | Vaughan | 34—20 |

WILLIAM J. WYE, *Primary Examiner.*